W. L. BLISS.
SYSTEM OF ELECTRICAL DISTRIBUTION.
APPLICATION FILED NOV. 15, 1915. RENEWED SEPT. 25, 1922.

1,434,363.

Patented Nov. 7, 1922.

Witnesses
W. H. Rostock
Ralph Munden

Inventor
William L. Bliss
By Raymond H. Van Kent
Attorney

Patented Nov. 7, 1922.

1,434,363

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

Application filed November 15, 1915, Serial No. 61,558. Renewed September 25, 1922. Serial No. 590,535.

*To all whom it may concern:*

Be it known that I, WILLIAM L. BLISS, a citizen of the United States, residing at Niagara Falls, in the county of Niagara and State of New York, have invented new and useful Improvements in Systems of Electrical Distribution, of which the following is a specification.

This invention relates to systems of electrical distribution.

The invention is especially applicable to the regulation of variable speed generators such as are used in railway car and automobile lighting systems wherein the generator is employed to charge a storage battery and supply a lamp or other load. When the generator is at rest or is operating at a low speed, the battery supplies the load.

In systems of the type above mentioned, it is often desirable to regulate the generator mainly in accordance with the battery charging current. This is especially the case where a large variable lamp load has to be supplied with current. The regulation in such a system is generally accomplished by an electro-magnetic winding in series in the battery lead, which controls a variable resistance in the field circuit of the generator. Should the lamp load to be supplied by the battery, when the generator is at rest or is operating at a low speed, exceed in value the current which will operate the regulator, there will result an operation of the regulator by the battery discharging current which will insert a resistance in the field circuit acting to prevent the generator from building up to a proper voltage until a very high speed has been attained.

In such systems also it is often desirable to provide a connection from the battery whereby the battery may furnish the initial exciting current to insure a proper building up of the generator field.

A difficulty which is encountered in some systems of regulation is due to the fact that after the battery has become fully charged and the generator voltage has been automatically reduced, the battery, which requires an appreciable time to sink to its normal floating voltage, may tend to discharge back through the generator, opening the automatic switch. The voltage of the generator being still high enough to close the automatic switch, causes said switch to close, when again the automatic switch opens by the reverse current which it receives from the battery. This results in a continual chattering of the switch until the battery sinks to its normal floating voltage and thus becomes exactly balanced with the generator, after which time the switch will remain closed.

An object of my invention is to provide an improved system of regulation which will avoid chattering of the automatic switch described above.

Another object of the invention is to provide a system which will insure a proper building up of the generator voltage and will prevent interference therewith by the battery discharging current.

Another object of the invention is to provide a generator regulator having increased stability at all generator speeds.

Another object of the invention is to provide a regulator which will insure close regulation of the generator under normal and abnormal circuit conditions.

Another object of the invention is to provide an improved system of regulation which will insure a proper generator voltage to permit floating the battery across the system when the battery is fully charged.

Another object of the invention is to provide improved means for regulating the generator in accordance with the state of charge of the battery.

These and other objects are obtainable by the systems illustrated in the accompanying drawing, in which—

Figure 1:
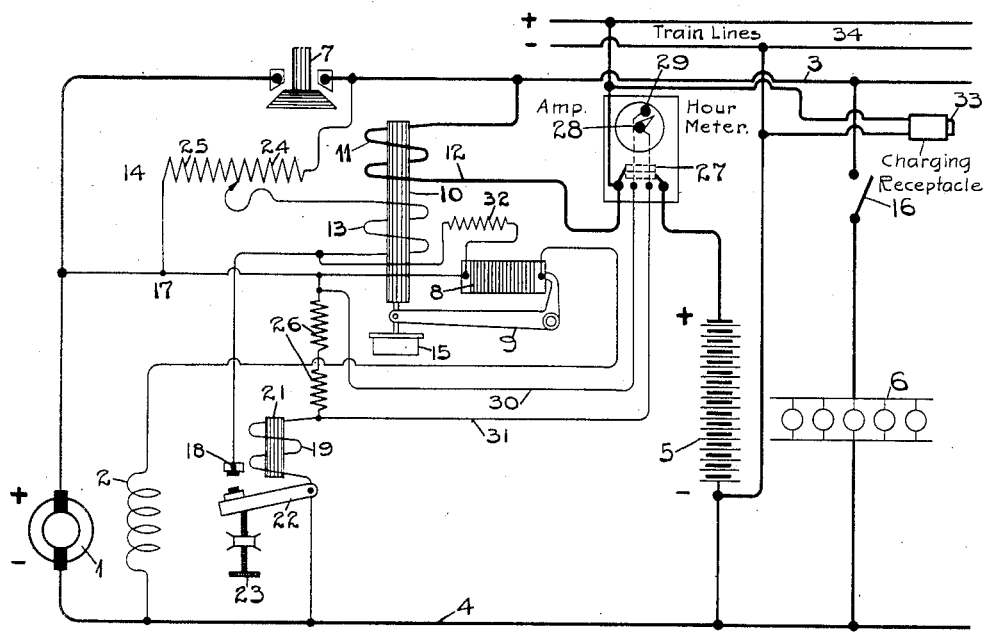
Figure 1 represents diagrammatically a system for providing constant charging current for the battery.

Figure 1 illustrates a variable speed generator having an armature 1 and a shunt field winding 2. Positive and negative generator leads 3 and 4 supply a storage battery 5 and lamps or other translating devices 6, connected in parallel branches across the leads. An automatic switch 7, of any preferred construction, is arranged in one of the generator leads. The automatic switch will connect the generator to the system when the generator voltage substantially equals the battery voltage, and will disconnect the generator when its voltage falls below that of the battery.

Regulation of the generator is accomplished by means of the variable resistance, herein illustrated as a compressible rheostat 8, in series with the generator field. The pressure on the rheostat is controlled by a bell crank lever 9, pivotally connected to a magnetic member or core 10, normally under the control of a coil 11, surrounding said core and connected in the battery lead 12. A second winding 13 is adapted under certain conditions, to assist or oppose the coil 11 in the control of the rheostat. Across the terminals of the automatic switch 7 is an adjustable resistance 14.

One terminal of the coil 13 is connected to a point approximately in the center of this resistance 14. The other terminal of the coil 13 is connected through the switch 22 to the negative lead 4. A dash-pot 15 may be provided to steady the action of the core 10. A switch 16 is provided for throwing the translating devices 6 in and out of circuit.

The switch 22 is operated by a magnet 21, energized by a coil 19 which is connected across the generator between the binding post 17 and the negative lead 4, through the resistance 26, preferably of zero temperature coefficient. The resistance 26 is adapted to be short-circuited under predetermined conditions by an ampere hour meter 27.

The meter 27 is connected in the battery circuit and may be of any desired type. It preferably consists of an integrating meter which will register the ampere hours delivered to the battery and will automatically change its rate on battery discharge to compensate for the internal losses of the battery, so as at all times to accurately indicate the state of charge of the battery. The indicating pointer 28 of the meter is adapted to make contact with the contact 29 when a full charge has been delivered to the battery. The pointer 28 and contact 29 control a short circuit around the resistance 26, which short circuit is closed when full battery charge is indicated and open when less than a full charge is indicated. The value of the resistance 26 is such that when it is short-circuited, the relay 19 will be caused to operate to change the standard of operation of the regulator and to thereby cause a reduction of the generator voltage sufficient to float the battery.

A charging receptacle is shown at 33 and train lines at 34. These are connected, as illustrated on the drawing, so that any current supplied to the battery by either the charging receptacle or the train lines will be recorded by the ampere hour meter and any current taken out of the battery by way of the train lines will likewise be recorded on the ampere hour meter.

When the generator is at rest or rotating below a critical speed, the automatic switch will be open as illustrated in the drawing, and the rheostat 8 will be under maximum pressure, whereby the resistance of the field circuit is a minimum. A small amount of current will flow from the positive battery terminal through the wire 12, coil 11, resistance section 24, coil 13, resistance 32, rheostat 8, field coil 2, to the negative terminal of the battery, thus producing initial excitation for the generator. The coils 13 and 11 are so wound as to assist one another when current is flowing to the battery in a charging direction, but to oppose one another when the battery is discharging. This arrangement of the coils 13 and 11 has the advantage that the flow of lamp current will not interfere with the "picking up" of the generator. The coils are so proportioned that the resultant differential effect on the core 10 will be insufficient to raise the core with any predetermined lamp load which the battery may be called upon to supply.

When the battery has become fully charged and the ampere hour meter and the relay 19 have operated, the battery will be, perhaps, at two volts higher voltage than the generator. In a standard 16-cell system, the regulator may be adjusted to maintain thirty-five (35) volts. Immediately after the battery has become fully charged and the ampere hour meter and switch 22 have operated, the voltage of the battery does not immediately sink to thirty-five (35) volts, but falls to a value of approximately thirty-seven (37) volts, and it requires an appreciable time before the voltage of the battery comes down to thirty-five (35) volts. This two volts excess of battery voltage over generator voltage will tend to open the automatic switch. Immediately upon any such tendency, current will discharge from the battery through the generator by way of the adjustable resistance 24—25. The increased current in section 24 produces an artificial drop in this section and therefore the coil 13 is not subjected to as high a voltage as it would otherwise be. There is a tendency to first regulate at thirty-seven (37) volts and gradually reduce to thirty-five (35) volts, the balance in voltage between the generator and the battery being automatically maintained. The automatic switch remains tightly closed and the current through the two halves of the adjustable resistance 24—25 will become equal, that in 25 actually reversing, and the voltage on the coil 13 will become normal.

Figure 2:
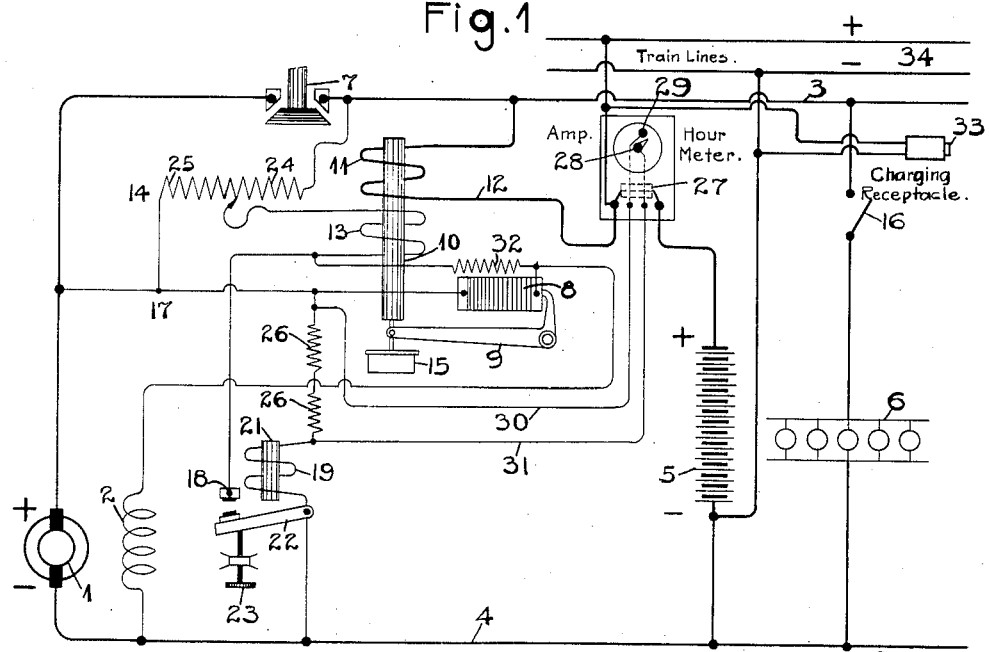
Figure 2 represents diagrammatically a modified arrangement for producing tapering charge for the battery.

The system illustrated in Figure 2 is, for the most part, the same as that shown in Figure 1. The system, as illustrated in Figure 1, has a flat charge characteristic, while that illustrated in Figure 2 has a tapering characteristic. The tapering characteristic is due to a parallel connection of the rheostat 8 and the coil 13 to the lead 3. As the resistance of the rheostat 8 is increased, the coil 13 will increasingly aid the coil 11, resulting in a tapering of the charging current.

In either of the systems illustrated, when the generator armature slows down, the automatic switch will open, and if the lamps are burning, the battery will discharge, thereby operating the ampere hour meter in a reverse direction to open the short circuit 30, 31 and include the resistance 26 in circuit, so that upon increase in generator speed, the system will operate as a constant battery current or taper charge regulator, according to the connections employed, until the battery is again fully charged.

The resistance 26 is given such a value that the meter switch 22 will not operate with the resistance in circuit until the voltage of the system has risen to an abnormal value, for example fifty (50) volts, under the conditions heretofore assumed. Should abnormal conditions arise, therefore, such for example as accidental open-circuiting of the battery, causing an abnormal rise in generator voltage, the switch 22 will operate to reduce the generator voltage to the predetermined floating battery voltage, which will be maintained, regardless of speed variations. In this system, therefore, the switch 22 which acts to convert the generator into a voltage regulator, will normally be under control of the ampere hour meter, but under abnormal conditions, will act to reduce the generator voltage to a safe value.

Two systems have been illustrated and described herein for the purpose of clearly pointing out the principles of the invention, but it is obvious that many other modifications may be made which will embody the principles of the invention as defined in the appended claims.

What I claim as new and desire to secure by Letters Patent of the United States is—

1. In a system containing a variable speed generator, a storage battery and a translation circuit, an automatic switch, a resistance bridging said switch, a regulator for said generator controlled by a current coil and a voltage coil, one end of said voltage coil being connected to an intermediate point of said resistance and the other end being adapted to be connected to one of the generator leads.

2. In combination, a variable speed generator having a field circuit, a regulator therefor, a storage battery, a current coil and a voltage coil for operating said regulator, an automatic switch, a resistance bridging said switch, one end of the voltage coil being connected to approximately the middle point of said resistance, the other end of the voltage coil being connected to the field circuit, whereby initial excitation of the generator field is supplied by the battery.

3. In combination, a generator, a regulator therefor, a battery, a current coil for controlling said regulator, a voltage coil for controlling said regulator, an automatic switch, a resistance bridged across said switch, one end of said voltage coil being connected to approximately the middle point of said resistance, the other end of said voltage coil being connected to the field circuit of the generator and also being adapted to be connected directly to one of the generator leads, said current and voltage coils being wound to assist on charge and oppose on discharge .

4. In an electrical system, a generator, an automatic switch, a resistance bridged across said switch, a voltage regulating coil for the generator, one end of which is connected to substantially the middle point of said resistance.

5. In a system containing a variable speed generator having a field winding, a storage battery to be charged by said generator, an automatic switch between said generator and said battery, a load circuit to be supplied by said generator or battery, a variable resistance for regulating the strength of said field winding and an electro-magnetic device for varying said resistance, said device having a current coil responsive to current flowing to or from said battery, and a winding adapted under predetermined conditions to oppose the effect of said current coil, a resistance bridging said switch, said winding being connected to substantially the mid point of said resistance.

6. In a system containing a variable speed generator having a field winding, regulating means for said field winding, an electromagnetic device for controlling said regulating means, said device having a current responsive coil and a voltage responsive coil, a storage battery, an automatic switch, a resistance bridging said switch, and connections including said field winding for connecting substantially the mid point of said resistance to the opposite side of the system.

7. In a system containing a variable speed generator having a field winding, regulating means for said field winding, an electromagnetic device for controlling said regulating means, said device having a current responsive coil and a voltage responsive coil, a storage battery, an automatic switch, a resistance bridging said switch, and connections including said field winding and voltage responsive coil for connecting substantially the mid point of said resistance to the opposite side of the system.

8. In a system containing a variable speed generator having a field winding, regulating means for said field winding, means for controlling said regulating means, an electro-magnetic winding acting under predetermined conditions to oppose said controlling means, a storage battery, an automatic switch, a resistance bridging said switch, and means including said field winding for connecting substantially the mid point of said resistance to the other side of the system.

9. In combination, a variable speed generator having a field winding, a storage battery to be supplied thereby, an automatic switch, electro-magnetic means for regulating said generator in accordance with battery charging current, means for rendering said electromagnetic means inoperative under predetermined conditions, a resistance and connections including said field winding for connecting substantially the mid point of said resistance to the other side of the system.

10. In a regulating system, a variable speed generator, a storage battery, an automatic switch, a resistance bridged across said switch, means for regulating said generator, means for operating said regulating means, said operating means having a current responsive winding and a voltage responsive winding, said voltage responsive winding being connected to substantially the mid point of said resistance, connections whereby said windings may oppose one another, and automatic means for varying the effectiveness of said voltage responsive winding.

11. In a regulating system, a variable speed generator, means for regulating the field of said generator, means for operating said regulating means, said operating means having a current responsive winding and a voltage responsive winding, means for varying the effectiveness of said voltage responsive winding, a storage battery, an automatic switch, a resistance bridging said switch and connections including the field winding of said generator for connecting substantially the mid point of said resistance to the other side of the system.

12. In an electrical system of distribution, a variable speed shunt wound generator, a storage battery, an automatic switch, a resistance bridging said switch, a regulating device for the field of said generator, said device having a coil in series with said battery and a coil having its respective terminals at substantially the mid-point of said resistance and a terminal of like polarity and means for connecting one terminal of said last mentioned coil to the opposite side of the system.

13. In an electrical system of distribution, a variable speed generator provided with a shunt field coil, regulating means for said field coil, a current responsive coil for controlling said regulating means, a voltage responsive coil for modifying the action of said current coil, a storage battery, an automatic switch, a resistance bridging said automatic switch and means for connecting substantially one half of said resistance in shunt around one of said coils.

14. In combination, a variable speed generator having a shunt field, a storage battery to be charged thereby, an automatic switch, a resistance bridging said switch, a regulator for said shunt field, a current responsive coil for controlling said regulator, a voltage responsive coil connected to substantially the mid point of said resistance, adapted under predetermined conditions to supersede said current coil in the control of said regulator, and an ampere hour meter measuring the charge and discharge of the battery for selectively determining which of said coils shall predominate in the control of the regulator.

15. A system of electrical distribution comprising a generator, a storage battery, an automatic switch, an automatic generator regulator provided with one coil for controlling its operation while the battery is being charged and with a shunt coil adapted to coact with the first coil when the battery receives a predetermined charge, and an integrating meter for measuring the battery charge and discharge and causing said shunt coil to become effective after the battery has received a predetermined charge, one terminal of said shunt coil being connected to each side of the automatic switch.

16. A system of electrical distribution comprising a generator, a storage battery, an automatic switch, an automatic generator regulator provided with one coil for controlling its operation while the battery is being charged and with a shunt coil adapted to coact with the first coil when the battery receives a predetermined charge, and an integrating meter for measuring the battery charge and discharge and causing said shunt coil to become effective after the battery has received a predetermined charge, one terminal of said shunt coil being connected to each side of the automatic switch through a resistance.

17. A system of electrical distribution comprising a generator, a storage battery, an automatic switch adapted to close the main circuit when the generator voltage is above a predetermined point and to open the main circuit when the generator voltage is below a predetermined point, a generator regulator provided with one coil to control its operation while the battery is being charged and with a shunt coil adapted to coact with the first coil and having one terminal connected to each side of the automatic switch through a resistance, a relay for controlling the energization of said shunt coil, and an integrating meter for measuring the battery charge and controlling the operation of said relay, whereby when the battery receives a predetermined charge the shunt coil becomes effective to reduce the generator voltage until the battery has had a predetermined discharge.

18. A system of electrical distribution comprising a generator, a storage battery, an automatic switch for controlling the main circuit from the generator to the battery, a generator regulator provided with one coil for controlling its operation while the battery is being charged and with a shunt coil having one terminal connected to both sides of the automatic switch, and means for causing said shunt coil to become effective and coact with the first coil when the battery receives a predetermined charge.

19. A system of electrical distribution comprising a generator, a storage battery, an automatic switch for controlling the main circuit from the generator to the battery, a generator regulator provided with one coil for controlling its operation while the battery is being charged and with a shunt coil having one terminal connected to both sides of the automatic switch through resistance, and means for causing said shunt coil to become effective and coact with the first coil when the battery receives a predetermined charge.

In witness whereof, I have hereunto subscribed my name.

WILLIAM L. BLISS.